United States Patent [19]

Reeder

[11] 4,264,656
[45] Apr. 28, 1981

[54] WATER-BASED COATING COMPOSITIONS AND PROCESS FOR COATING SAID COMPOSITIONS

[75] Inventor: Frank Reeder, Coventry, England

[73] Assignee: Courtaulds Limited, London, England

[21] Appl. No.: 41,529

[22] Filed: May 23, 1979

[30] Foreign Application Priority Data

May 24, 1978 [GB] United Kingdom .............. 21780/78

[51] Int. Cl.$^3$ ........................ B05D 3/02; C08L 33/08; C08L 33/10; C08L 61/20
[52] U.S. Cl. ........................ 427/385.5; 260/29.4 UA; 260/29.6 XA; 260/29.6 TA; 260/29.6 AT; 260/29.6 PM; 427/388.1; 427/388.2; 427/388.3; 427/388.4; 427/389.7; 427/391; 427/393
[58] Field of Search ...................... 525/380, 329, 384; 427/388 R, 388 A, 388 B, 388 C, 388.1, 388.2, 388.3, 388.4, 389.7, 391, 393, 385.5; 260/29.6 XA, 29.6 AT, 29.6 TA, 29.4 UA, 29.6 PM

[56] References Cited

U.S. PATENT DOCUMENTS

| | | | |
|---|---|---|---|
| 2,988,539 | 6/1961 | Cohen et al. ..................... | 525/380 X |
| 3,182,047 | 5/1965 | Wehrmeister et al. ............. | 525/380 X |
| 3,203,935 | 8/1965 | Miranda et al. .................. | 525/380 X |
| 3,352,806 | 11/1967 | Hicks ........................... | 260/29.4 UA |
| 3,928,273 | 12/1975 | Chang et al. ................. | 260/29.4 UA |
| 4,049,607 | 9/1977 | Berghoff ....................... | 260/29.4 UA |
| 4,136,075 | 1/1979 | Finn et al. ..................... | 260/29.6 TA |

FOREIGN PATENT DOCUMENTS

226762 3/1959 Australia .
1530021 10/1978 United Kingdom .

OTHER PUBLICATIONS

Z. W. Wicks et al., Journal of Coating Technology, vol. 50 pp. 39–46, (1978).
M. E. Woods Double Liaison, vol. 24 pp. 40–47, (1977).

*Primary Examiner*—Ronald H. Smith
*Assistant Examiner*—Thurman K. Page
*Attorney, Agent, or Firm*—Davis, Hoxie, Faithfull & Hapgood

[57] ABSTRACT

A water-based coating composition which emits very little pollutants on curing to a water-resistant coating comprises a synthetic resin containing free carboxyl groups held in solution or stable dispersion in water by an amine. The amine is a tertiary carbinamine containing at least two hydroxymethyl groups bonded to the carbon atom carrying the amine group. The coating compositions react with formaldehyde to produce stable fluid emulsion coating compositions having similar properties on curing. The coating compositions are used to coat substrates.

12 Claims, No Drawings

WATER-BASED COATING COMPOSITIONS AND PROCESS FOR COATING SAID COMPOSITIONS

This invention relates to water-based coating compositions. Coating compositions based on volatile organic solvents which are released into the atmosphere during drying of the coating have been regarded increasingly unfavourably in recent years. One way of avoiding organic solvents has been to use coating compositions based on a film-forming polymer containing sufficient carboxyl groups to make it water dilutable when neutralised with an amine, although most such compositions have used an organic co-solvent. An aqueous dispersion of such a polymer is applied as a coating and heated to drive off the water, amine and co-solvent. Unfortunately, the amine released into the atmosphere from such a coating may be more noxious than the volatile organic solvent it replaces. The present invention seeks to produce a heat-curable water-based coating composition from which only a minor amount of the amine used to solubilise a carboxyl containing polymer is released on heating.

An article by Z. W. Wicks and G-F Chen in Journal of Coatings Technology Vol. 50 pp 39-46 (1978) describes the use of various amines as solubilisers for acrylic copolymers containing free carboxyl groups. The copolymers were mixed with a methylated melamine formaldehyde resin, diluted with amine and water and cured as a coating at 175° C. 2-N,N-dimethylamino-2-methylpropanol gave the lowest amine loss on curing followed by 2-amino-2-methylpropanol which also showed the greatest curing.

According to the invention, a coating composition comprises a synthetic resin containing free carboxyl groups held in solution or stable dispersion in water by a tertiary carbinamine containing at least two hydroxyl methyl groups bonded to the carbon atom carrying the amine group, the tertiary carbinamine being present at 0.3-1.1 moles per gram equivalent of free carboxyl groups in the resin.

The aqueous dispersion can be a solution of the synthetic resin or a stable colloidal dispersion or an emulsion. The water acting as solvent or dispersion medium can be mixed with up to its own weight of a water-miscible organic solvent, although it is preferred not to use such an organic solvent. The aqueous dispersion should in any case be infinitely dilutable with water without coagulation or precipitation.

One example of a suitable synthetic resin is a copolymer of acrylic or methacrylic acid with one or more ethylenically unsaturated comonomers. Such comonomers include acrylic compounds such as alkyl acrylates and methacrylates, for example methyl methacrylate, ethyl methacrylate, propyl methacrylate, butyl methacrylate, ethyl acrylate and butyl acrylate, hydroxyalkyl methacrylates and acrylates such as hydroxymethyl methacrylate, hydroxyethyl acrylate, hydroxy propyl acrylate and hydroxy propyl methacrylate, and acrylamide, methacrylamide, acrylonitrile and methacrylonitrile. Longer chain methacrylate and acrylate esters such as 2-ethylhexyl methacrylate, lauryl methacrylate, 2-ethyl-hexyl acrylate and stearyl methacrylate can be used, particularly when a more flexible film is desired. Non-acrylic comonomers such as styrene can also be used. Preferably, at least one comonomer contains an amide group or a hydroxy group. Desirably, there is also present a comonomer containing no amide, hydroxy or other reactive functional group.

An alternative synthetic resin is a polyester prepared from a polycarboxylic acid or anhydride such as phthalic anhydride, adipic acid and/or trimellitic anhydride and a polyol such as ethylene glycol, propylene glycol, trimethylolpropane and/or pentaerythritol. The polyester can be prepared using an excess of the acid or anhydride so that it has free carboxylic acid groups. A further alternative is an epoxy resin having pendant carboxylic acid groups.

The term "tertiary carbinamine" denotes a compound having an $NH_2$ group attached to a carbon atom which is also attached to 3 other carbon atoms. The tertiary carbinamine preferably has the formula

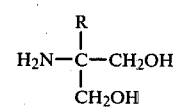

where R represents an alkyl, cycloalkyl, aryl or aralkyl group which can be hydroxy-substituted or substituted by halogen, for example chlorine or bromine. The group R preferably contains 8 or less carbon atoms. Most preferably the group R is methyl, ethyl, hydroxymethyl or β-hydroxyethyl. For example the amine can be 2-amino-2-methyl-propane-1,3-diol.

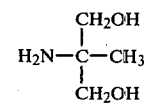

2-amino-2-hydroxymethyl-butan-1-ol (i.e. 2-amino-2-ethylpropane-1,3-diol)

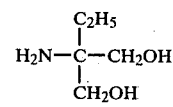

or tris(hydroxymethyl)-methylamine

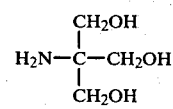

The amine preferably has a boiling point of at least 200° C. to prevent emission of the amine on heating before it has taken part in the curing reaction.

The simplest coating compositions according to the invention consists essentially of an aqueous solution of the carboxyl-containing polymer and the hydroxy-substituted tertiary carbinamine. Such a composition can be applied as a coating, dried and then cured by heating, for example at 150°-200° C. in 10-60 minutes. The coating cures to a hard glossy water-resistant film. The coating can be dried or allowed to dry followed by curing in a separate step, or the heating to dry the coating and to cure it can follow shortly after coating in a single heating step. We believe that the hydroxy-substituted tertiary carbinamine reacts in part with the carboxyl groups in the polymer according to the following equation (R being an arbitrary organic group)

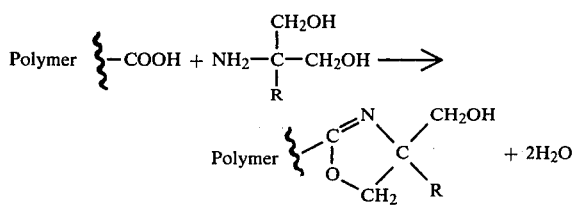

The conversion of the hydrophilic carboxyl group to the less hydrophilic oxazoline ring reduces the water sensitivity of the cured coating compared to known coatings of carboxyl containing polymers applied from aqueous solutions stabilised by amine.

The synthetic resin usually contains from 0.7 or 0.8 to 2.0 milliequivalents (meq) per gram of carboxylic acid groups. The proportion of carboxylic acid groups required to give adequate water solubility varies depending on the proportion of other hydrophilic groups in the polymer. When the carboxyl-containing polymer also contains amide and hydroxy groups, for example an acrylic copolymer whose comonomers include acrylamide or methacrylamide, the carboxylic acid content is preferably from 0.8 or 1.0 to 1.4 meq/gm and can be even lower if the hydrophilic groups are present in a high proportion. When the carboxyl-containing polymer contains no such hydrophilic groups or only a small proportion of them, the carboxylic acid content may need to be at least 1.5 meq/gm to give the desired water solubility.

The ratio of tertiary carbinamine used to carboxylic acid groups in the synthetic resin depends partially on the content of carboxylic acid groups and other hydrophilic groups in the synthetic resin. Generally speaking, it is required to be sufficient to render the synthetic resin soluble in water. As little as 0.3 moles tertiary carbinamine per gram equivalent of carboxylic acid groups may be sufficient to confer water solubility where there is a high proportion of hydrophilic groups but 0.6–1.0 moles tertiary carbinamine per gram equivalent is usually preferred. A low amine content gives the advantage of lower solution viscosity, but a higher amine content gives higher stability.

The coating compositions of the invention can be prepared in various ways. For example, the solid carboxyl-containing copolymer can be dissolved directly in an aqueous solution of the amine. Alternatively, the amine can be added to an aqueous emulsion of the polymer to convert that emulsion to a solution.

A carboxyl-containing acrylic polymer can be prepared by solution polymerisation, preferably in a water-miscible organic solvent such as ethanol, isopropanol or t-butanol or dioxane, although an immiscible solvent such as xylene can be used. The tertiary carbinamine can then be added with addition of water and removal of the organic solvent.

In most cases it is preferred that the carboxyl-containing polymer should be fully water-soluble after addition of the tertiary carbinamine, despite any tendency for the composition of the polymer to vary because of differences in reactivity of the comonomers used. This can, for example, be achieved by selecting hydrophilic and hydrophobic monomers with an appropriate balance of reactivities to ensure that the water-solubility of the polymer formed does not decrease as the reaction progresses. For example, a mix of butyl acrylate, butyl methacrylate, methacrylic acid and hydroxyethyl acrylate may produce a polymer relatively rich in carboxyl groups in the earlier part of the reaction and relatively rich in hydroxyl groups in the later part of the reaction, but all fractions of which are water-soluble. Alternative techniques known in the art for producing copolymers of more consistent composition are continuous polymerisation or controlled addition of a monomer mix richer in the more reactive components during the course of the reaction.

Alternatively, the carboxyl-containing acrylic copolymer can be prepared by polymerisation in water, optionally with an organic co-solvent, in the presence of the tertiary carbinamine. We have found that at neutral or acid pH competing reactions such as Michael addition to the double bond and aminolysis of ester groups are substantially absent.

Alternatively, compositions can be prepared which are aqueous dispersions containing polymer both as the disperse phase and dissolved in the continuous aqueous phase. For example a carboxyl-containing acrylic polymer capable of being made soluble in water by the tertiary carbinamine can be prepared by solution polymerisation in a water-miscible organic solvent. A second monomer mix is then polymerised in the same system, the ratio of monomers in the second mix being such that the polymer formed from them is not water-soluble, but is emulsifiable in water in the presence of the water-soluble polymer. The second monomer mix generally contains carboxylic acid groups and other groups conferring water-solubility in a lower proportion than the first prepared polymer. On addition of the tertiary carbinamine and water and removal of the organic solvent, a solution/emulsion system is formed.

A solution/emulsion composition can alternatively be prepared by emulsion polymerisation techniques. Monomers selected to give a water-soluble polymer are initially emulsion polymerised in small amounts in the presence of an emulsifying agent. The water-soluble polymer formed then aids in the stabilising of further emulsion polymerisation. This may be of a second monomer mix as described above, selected to give a water-insoluble emulsion phase, or a second polymerisation step can be used in which monomers selected to give a water-soluble polymer are polymerised in larger amounts than were used in the initial emulsion polymerisation step. In the latter process, much larger amounts of the monomer mix selected to give a water-insoluble emulsion phase can then be emulsion polymerised in a third step to give a stable polymer emulsion having polymer in both dissolved and disperse phases and containing a very low proportion of emulsifying agent.

The coating compositions according to the invention remain stable over long periods. The tertiary carbinamines are unusually inert compared to other primary amines and to secondary amines, especially in the aminolysis of ester groups which may be present in the polymer.

Coating compositions according to the present invention can be reacted with an aldehyde, preferably formaldehyde, which can react with amino and hydroxy groups in the amine and with amide if present in the carboxyl-containing polymer. The use of formaldehyde can produce surprising advantages. When formaldehyde is added to a coating composition according to the invention which is in the form of an aqueous solution, the solution is progressively converted, as the amount of formaldehyde is increased, via a colloidal dispersion to a stable and fluid emulsion containing the polymer in both soluble and disperse phases.

An emulsion coating composition can thereby be prepared without added emulsifiers, plasticisers or solvents whose presence in the cured coating might tend to lower film properties such as hardness and water and solvent resistance. The dispersions and emulsions have the advantages that they remain fluid at high solids content and can give a thick cured glossy coating in one application, for example they can be applied at a solids content of 35–50 percent by weight.

One possible explanation of the formation of the dispersion is the fall in pH caused by conversion of the tertiary carbinamine to a bicyclic oxazolidine which is only weakly basic, for example according to the following equation (R being an arbitary organic group)

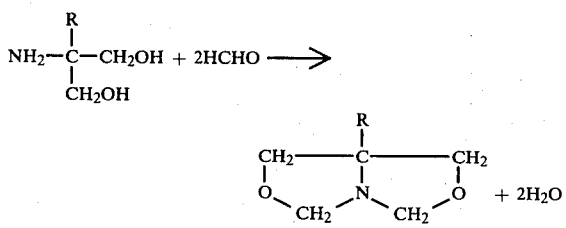

If the total amount of formaldehyde required by this theoretical equation is added, the emulsion usually breaks. The amount of formaldehyde added is preferably 0.5–1.7 moles per mole of tertiary carbinamine to obtain a stable dispersion. Within this range the optimum amount of formaldehyde generally increases with an increasing amine and carboxylic acid content in the composition.

Such a dispersion can be applied as a coating which can be cured by heating at 150°–200° C. to a water-resistant film of excellent gloss and hardness. The uncured dispersion can generally be readily washed off apparatus used to apply it, but the cured film shows good adhesion to a wide variety of substrates, for example glass, wood, paper and metals such as steel.

A polar organic solvent can be present during the preparation of dispersions by addition of formaldehyde. For example, when an acrylic carboxyl-containing polymer has been prepared by solution polymerisation and has been solubilised by addition of water and tertiary carbinamine, the formaldehyde can be added before the solvent is removed. In this case, the removal of solvent serves to increase the solids content of the coating composition to the desired level of 30–50 percent as well as to provide a solvent-free composition. This procedure has the advantage of maintaining a sufficiently low viscosity without adding extra water which has to be evaporated off subsequently to raise the viscosity of the emulsion. Solvent removed during preparation of the coating composition is of course not emitted to the atmosphere as solvent drying from a solvent based coating is; the solvent is recovered for re-use.

Coating compositions according to the invention can contain additional resinous or film-forming ingredients. Provided that the composition as a whole is stable as an aqueous solution or dispersion, the composition can also contain a cross-linking agent for the synthetic resin, for example a cross-linking agent capable of reacting with hydroxy groups and/or amide or carboxyl groups such as a fully or partially etherified amino-formaldehyde condensate. Examples of such cross-linking agents are the methylated melamine formaldehyde condensates sold under the trade marks "Cymel 300", "Cymel 301" and "Cymel 303" and consisting predominantly of hexamethoxymethyl melamine and condensates of formaldehyde with benzoguanamine or urea such as methoxymethylated benzoguanamine and methoxymethylated urea We do not know what is the predominant reaction during curing of compositions containing such a cross-linking agent. One reaction taking place may be the formation of the oxazoline rings as described above together with the reaction of the remaining hydroxymethyl group or groups with the cross-linking agent. Where amide and hydroxy groups are present in the carboxyl-containing polymer, these can also react with the amino-formaldehyde cross-linking agent.

An amino-formaldehyde condensate cross-linking agent can be present during manufacture of the coating compositions and may act as a co-solvent for the carboxyl-containing polymer. When the polymer has been prepared by solution polymerisation in an organic solvent, a cross-linking agent such as hexamethoxymethyl melamine can be added to the polymer solution at the same stage as the tertiary carbinamine is added, before the organic solvent is removed. The use of an amino-formaldehyde condensate in this way can reduce the proportion of carboxylic acid groups needed to make the polymer soluble.

A catalyst for the curing reaction can be included in the coating composition although we have found that the compositions cure satisfactorily even at pH 7–8, especially if amide groups are present in the carboxyl-containing polymer. The catalyst is generally an acidic material such as p-toluene sulphonic acid or other alkyl benzene sulphonic acids. The catalyst can be included during the preparation of the synthetic resin solution, although if so present it is preferably neutralised, generally with the tertiary carbinamine used to solubilise the resin. Alternatively, strong acid groups such as sulphonic acid groups can be incorporated in the carboxyl-containing polymer.

The etherified amino-formaldehyde condensate and cross-linking agents can be used in addition to formaldehyde and can be added either before or after the formation of the emulsion. The etherified amino-formaldehyde condensates further improve the resistance of the cured films to water and polar organic solvents.

The presence of an amino-formaldehyde condensate may reduce the quantity of formaldehyde needed to form an emulsion.

An alternative cross-linking agent which can be used with coating compositions according to the present invention is a polyfunctional β-hydroxyalkylamide, for example bis[N,N-di(β-hydroxyethyl)]adipamide, bis[N,N-di(β-hydroxyethyl]azelamide and the corresponding β-hydroxypropyl compounds. These compounds cause cross-linking by reaction with carboxyl groups in the polymer. They are preferably used in coating compositions containing less than an equivalent amount of tertiary carbinamine based on carboxylic acid groups in the polymer. The polyfunctional β-hydroxyalkylamine cross-linking agents have the advantage that they eliminate water rather than a volatile organic material such as methanol during curing. However, we have found them less effective than the amino-formaldehyde condensates as cross-linking agents, that is, they require a higher curing temperature, for example 180° C. rather than 150° C., to produce the same degree of water and solvent resistance in the cured film.

Alternatively, the carboxyl-containing polymer can contain β-hydroxyalkylamide groups which cause a cross-linking reaction in the same way. For example an acrylic copolymer can be prepared using an N-β-hydroxyalkyl or N,N-bis(β-hydroxyalkyl) derivative of acrylamide or methacrylamide, such as N,N-bis(β-hydroxyethyl) acrylamide or N,N-bis(β-hydroxyethyl) methacrylamide (which are preferred), N-(1,1-dimethyl-2-hydroxyethyl)methacrylamide, N-β-hydroxyethyl acrylamide or N-β-hydroxypropyl acrylamide.

The coating compositions according to the invention can be used in pigmented or unpigmented form and are useful for coating substrates such as mild steel and tinplate, for example in enamels for coating domestic appliances, top coat paints for cars and in can coatings.

The coating compositions according to the invention, particularly those in which the carboxyl-containing polymer is held in aqueous solution by the tertiary carbinamine, have also been found to show advantages in blends with polymer emulsion coating compositions not made according to the invention, for example acrylic polymer emulsions prepared by emulsion polymerisation. The polymer solution improves the flow and gloss of the emulsion coating and facilitates cleaning of equipment. Blending water-soluble polymers with emulsions is known, but the emission of amine and usually auxiliary solvent on curing is a serious disadvantage of known water-soluble polymers for most uses of emulsion/solution blends.

This invention is illustrated by the following examples in which parts and percentages are by weight unless otherwise stated. Parts by volume bear the same relationship to parts by weight as the liter to the kilogram.

EXAMPLE 1

A feedmix was made consisting of 216 parts of butylmethacrylate, 77 parts of methylmethacrylate, 81 parts of hydroxyethylmethacrylate, 52.8 parts of methacrylamide, 53.3 parts of methacrylic acid, 24 parts of azobisisobutyronitrile and 950 parts of ethanol. The mixture was stirred under reflux and under nitrogen in a flask jacketed at 75° C. for 3 hours. The product was precipitated by pouring into water, filtered, washed and dried. The dried product was ground in a Wiley mill and passed through a 44 mesh British standard sieve. 120.2 parts of the dried polymer were stirred with 160 parts of dioxane and 30 parts of water at 60° C. until dissolved. To the viscous solution was added a solution of 17.64 parts of tris(hydroxymethyl)methylamine in 120 parts of water. The clear solution was transferred to a rotary vacuum evaporator and the dioxane stripped off. Water was added gradually as evaporation proceeded to avoid too great an increase in viscosity. The distillation was stopped after 310 parts of dioxane/water mixture had been removed. The product was a clear viscous solution containing 30 percent total solids.

Films were cast on glass, mild steel and tinplate substrates, dried and cured at 180° C. for 25 minutes. The cured films were hard, clear and glossy and showed good adhesion to all three substrates. Resistance to water was good, as shown by the lack of blushing in pasteurisation tests on tinplate and by the protection of mild steel panels against rusting when suspended in water for 14 days. The weight loss of cured films on prolonged immersion in 2-butoxyethanol was small, and the films were recovered in satisfactory condition after drying off.

EXAMPLE 2

A carboxyl-containing copolymer was prepared by solution polymerisation in ethanol as described in Example 1. The copolymer was not precipitated or dried. 17.64 parts of tris(hydroxymethyl) methylamine in 120 parts of water were added to the ethanolic solution containing 120 parts of the copolymer. Ethanol was then stripped off in a rotary vacuum evaporator and water was added gradually to avoid too great an increase in viscosity. The product was a clear, viscous aqueous solution which when applied as a coating composition could be cured as described in Example 1 to give hard, clear glossy water-resistant films as described in Example 1.

EXAMPLE 3

A coating composition in the form of a 30 percent solids aqueous solution was prepared as in Example 1. 12 parts of "Cymel 301" methylated melamine formaldehyde condensate were added to 100 parts of the 30 percent aqueous resin solution and stirred to homogenise. Films were made by casting on glass, mild steel and tinplate substrates and were dried and cured at 150° C. for 30 minutes. The films showed good adhesion to all three substrates and were hard and glossy. Resistance to water was good, as shown by the lack of blushing in pasteurisation tests on tinplate and by the protection of mild steel panels against rusting when suspended in water for 14 days. The adhesion to the substrates was tested by the crosshatch test in which two pairs of parallel lines intersecting approximately at right angles are cut in the cured coating through to the substrate. Adhesive tape is firmly applied to the cut area and then peeled off. The coating at the intersection of the pairs of lines is then examined to see how much has been pulled off by the adhesive tape. The result is expressed as the percentage of the area of the paint film remaining after the test. The cured coatings of this Example gave 100 percent results (that is, no coating removed by the adhesive tape) both before and after pasteurisation.

Further films were cast on glass, mild steel and tinplate substrates, and were dried and cured at 180° C. for 20 minutes. The hard, glossy films produced had a resistance to water and an adhesion to the substrates as good as, or slightly better than, the films cured at 150° C. The films cured at 180° C. were immersed in 2-butoxy ethanol and were very little affected by it. They absorbed only 3 percent of their own weight of solvent during prolonged immersion and the films were recovered in satisfactory condition after drying off with zero weight loss.

EXAMPLE 4

A carboxyl-containing acrylic copolymer was prepared by solution polymerisation in ethanol, precipitated by water, dried and ground, all as described in Example 1. 100 parts of the acrylic copolymer, 14.7 parts of tris(hydroxymethyl) methylamine, 100 parts of water, and 132 parts of dioxane were stirred initially at 40° C., the temperature being raised to 60° C. over 30 minutes. A further 150 parts of water were added and stirring continued for a further 30 minutes. The solution was then cooled to 50° C., and a mixture of 11.2 parts of 39 percent aqueous formaldehyde and 12 parts of dioxane were added dropwise over a period of 6 minutes;

the temperature was then raised to 75° C. over 30 minutes. The resulting emulsion was transferred to a rotary vacuum evaporator, and the dioxane and some water stripped off to yield an aqueous emulsion coating composition containing 31 percent total solids. Films were cast on glass plates, dried and then stoved for 20 minutes at 180° C. The cured films produced were hard, clear and glossy, and had good resistance to water.

EXAMPLE 5

A 31 percent solids aqueous emulsion coating composition was prepared as described in Example 4. 8.4 percent of "Cymel 301" methylated melamine formaldehyde condensate was stirred into the emulsion. Films were cast on glass, mild steel and tinplate substrates from the coating composition produced. The films were dried and then cured for 20 minutes at 180° C. Excellent hard, glossy films were obtained which showed good adhesion to all three substrates in the crosshatch test described in Example 3 and showed good resistance to water in pasteurisation tests on tinplate and rust resistance tests on mild steel.

EXAMPLE 6

A polymer was made by the general method of Example 1 from 30.5 parts 2-ethylhexyl acrylate, 30.5 parts butyl methacrylate, 16.9 parts hydroxyethyl methacrylate, 11.1 parts methacrylic acid and 11.0 parts methacrylamide. These monomers were polymerised for 3 hours at 75° C. in 200 parts by volume ethanol using azobis-isobutyronitrile as initiator. The polymer produced was precipitated in water, washed, ground and dried. 100 parts of the dry ground polymer was slurried with 240 parts by volume water in a jacketed vessel fitted with contrarotating spiral stirrers and heated to 70° C. A solution of 14.9 parts tris(hydroxymethyl)methylamine in 95 parts water was added with vigorous stirring to give a clear viscous solution containing 25% solids.

Films were cast on glass, mild steel and tinplate substrates and were dried and cured at 180° C. for 25 minutes. The cured films were hard, clear and glossy and showed good adhesion to all three substrates. Their resistance to water and 2-butoxyethanol was similar to that of the cured coatings of Example 1, but the coatings of this Example were more flexible when assessed by impact and bending tests.

EXAMPLE 7

"Cymel 303" methylated melamine-formaldehyde resin was added to the clear viscous solution prepared in Example 6 at 22 percent based on solids. Films were cast on glass, mild steel and tinplate substrates and dried and cured at 150° C. for 30 minutes. They had a resistance to water and an adhesion to the substrates equal to the coatings of Example 3, but were more flexible when assessed by impact and bending tests.

EXAMPLE 8

A polymer was prepared by the general method of Example 1 from butyl methacrylate (31.4 percent), dodecyl methacrylate (31.4 percent), hydroxyethyl methacrylate (16.1 percent), methacrylic acid (10.6 percent) and methacrylamide (10.5 percent). Polymerisation was in ethanol at 75° C. using 5 percent azobis-isobutyronitrile as initiator. The polymer produced was precipitated in water, filtered and washed to yield a moist cake containing 625 parts polymer and 725 parts water. This was mixed with a solution of 88.8 parts tris(hydroxymethyl)methylamine in 40 parts by volume water at 60° C. in a Baker Perkins jacketed mixer with intermeshing blades. 160 parts of "Cymel 301" methylated melamine-formaldehyde resin was added and mixing was continued to give a thick clear dough of viscosity greater than 100 Pa.s.

To this dough was gradually added at 65° C. 167.7 parts by volume of 14.9% weight/volume aqueous formaldehyde. Mixing was continued for 1 hour at 67° C. The product was an opalescent colloidal dispersion of solids content 44% and viscosity 3 Pa.s. On dilution to 40% solids the viscosity was only 0.15 Pa.s., that is the dispersion was suitable for application as a surface coating by conventional means.

Films were cast on glass, tinplate and mild steel substrates and were dried and cured at 150° C. for 30 minutes to clear, hard, glossy films. The cured films showed a resistance to water in pasteurisation and rusting tests equal to the product of Example 3 and also 100% adhesion to the substrates in the cross-hatch test both before and after pasteurisation.

EXAMPLE 9

86.2 parts butyl acrylate, 19.6 parts hydroxyethyl acrylate, 12.0 parts acrylamide and 12.17 parts acrylic acid were copolymerized for 3 hours at 75° C. in 200 parts by volume t-butanol mixed with 18 parts by volume water using 3.9 parts azobis-isobutyronitrile as initiator and 0.13 part dodecyl mercaptan as chain transfer agent. A solution of 20.0 parts tris(hydroxymethyl)methylamine in 60 parts by volume water was added to the polymer solution produced, followed by 170 parts by volume more water. Most of the t-butanol was then stripped from the solution under vacuum with stirring, to leave a viscous solution.

This was cooled to 60° C. and 41.6 parts by volume of 18.5 weight/volume aqueous formaldehyde was added with stirring. Mixing was continued for a further 45 minutes at 70° C., and then the solution was again stripped under vacuum to remove the remaining t-butanol and some water. The product was an opaque fluid dispersion of solids content 32 percent.

Films were cast from this dispersion on steel and tinplate surfaces and were cured at 180° C. for 20 minutes. The cured films were clear, hard and glossy. They showed the same good resistance to water as the product of Example 1.

The carboxyl-containing polymer of this Example contained 1.30 meq carboxylic acid groups per gram of polymer. The amount of formaldehyde added was 1.52 moles per mole of tris(hydroxymethyl)methylamine.

When this Example was repeated adding varying amounts of formaldehyde to the viscous solution of polymer and amine, the use of 1.0 mole of formaldehyde per mole of amine gave an opalescent dispersion of fairly high viscosity. If the molar ratio of formaldehyde to amine is increased to 1.2–1.3:1 the viscosity of the dispersion decreases and its opacity increases. If the molar ratio is increased to 1.5–1.6:1 as in the Example a very fluid and opaque emulsion is formed which will however produce clear and glossy cured coatings. If the molar ratio of formaldehyde to amine is increased much above 1.6:1 the cured coatings may be opaque.

EXAMPLE 10

Butyl methacrylate (34.5 percent), butyl acrylate (34.5 percent), hydroxyethyl methacrylate (18 percent)

and methacrylic acid (13 percent) were copolymerised under the conditions described in Example 1. The polymer produced was precipitated in water, washed, dried and ground. 180 parts of polymer was slurried with 220 parts of water and a solution of 31.9 parts of tris(hydroxymethyl)methylamine in 90 parts of water was added with vigorous stirring using contrarotating stirrers. The temperature was increased to 70° C. and 47.8 parts "Cymel 301" methylated melamine formaldehyde condensate were added. Stirring was continued to give a clear thick solution. 20 parts by volume of 37% weight/volume aqueous formaldehyde was added slowly with stirring and heating was continued for 45 minutes at 70° C. The product was an opalescent fluid dispersion.

Films were cast from the solution on steel and tinplate substrates and dried and cured at 150° C. for 30 minutes. The cured films were clear, hard and glossy and were water-resistant and adherent as shown by the tests described in Examples 1 and 3.

EXAMPLE 11

Two monomer feed mixes were made up:

|  | (i) (parts) | (ii) (parts) | Overall (%) |
| --- | --- | --- | --- |
| Methyl methacrylate | 47.0 | 178.1 | 12.1 |
| Butyl methacrylate | 51.5 | 285.7 | 18.0 |
| Ethyl acrylate | 151.8 | 307.6 | 24.6 |
| Butyl acrylate | 124.3 | 246.4 | 19.9 |
| Hydroxyethyl acrylate | 77.1 | 226.7 | 16.3 |
| Methyacrylic acid | 20.47 | 101.9 | 6.57 |
| Acrylic acid | 15.52 | 31.1 | 2.50 |
|  |  |  | 100.00 |
| Azobisisobutyronitrile | 9.35 | 28.1 | 2.0 |
| Isopropanol | 515 | 1543 | — |

Feed (i) was pumped over 6 minutes into a 10 liter flask fitted with stirrer, reflux condenser, and water jacketed, under a nitrogen atmosphere. Feed (ii) was then pumped in over a period of 42 minutes, more rapidly at the beginning with the rate slowing towards the end of the addition. The internal temperature was held at 85°±2° C. After the addition was complete, reaction was continued for 3 hours at 85° C. The contents of the flask were cooled, and 249 parts of tris(hydroxymethyl)methylamine were added in 850 parts by volume of water, followed by 307 parts of "Cymel 301" methylated melamine formaldehyde condensate and 1800 parts of water. About 60 percent of the isopropanol was then stripped off at approximately 27 millibars (20 mm Hg) pressure, initially at a low jacket temperature but raising this to 40° C. as distillation proceeded. 203.4 parts by volume of 36.4 percent w/v aqueous formaldehyde and 197 parts by volume of water were then added dropwise followed by 250 parts by volume of water. Distillation of isopropanol and water was continued until substantially all the isopropanol had been removed. The solution was cooled, and 33.9 parts of a long chain alkyl benzene sulphonic acid catalyst sold by American Cyanamid Co. under the trade mark C600 neutralised with 12.5 parts of tris(hydroxymethyl)methylamine dissolved in 30 parts of water were added, followed by 3.02 parts of a proprietary silicone resin anti-cratering agent sold under the trade mark DC57.

The product was an emulsion containing a disperse phase of particle diameter of about 1–1.5 microns, and containing soluble polymer in the aqueous continuous phase. The viscosity was 0.57 Pa.s. (at a shear rate of 900 sec$^{-1}$), at a solids content of 47.6 percent.

Films cast on steel and tinplate and stoved at 150° C. for 30 minutes exhibited good flow and gloss, and a good combination of hardness, flexibility, and adhesion to the substrate. The resistance to water in pasteurisation tests as described in Example 1 was good.

EXAMPLE 12

A solution in isopropanol of a copolymer containing carboxylic acid groups was prepared from the following monomer feed mixes using the polymerisation technique described in Example 11.

|  | (i) (parts) | (ii) (parts) | Overall (%) |
| --- | --- | --- | --- |
| Methyl methacrylate | 3.38 | 12.8 | 8.1 |
| Butyl methacrylate | 6.72 | 37.3 | 22.0 |
| Ethyl acrylate | 16.26 | 32.9 | 24.6 |
| Butyl acrylate | 13.35 | 26.5 | 19.9 |
| Hydroxyethyl acrylate | 8.27 | 24.3 | 16.3 |
| Methacrylic acid | 2.20 | 10.9 | 6.57 |
| Acrylic acid | 1.66 | 3.3 | 2.50 |
| Azobisisobutyronitrile | 1.00 | 3.0 |  |
| Isopropanol | 55 | 165 |  |

21.0 parts of 2-amino-2-ethylpropane-1,3-diol in 80 parts of water was added (80 percent) of carboxyl equivalent) followed by 33.1 parts of "Cymel 301" methylated melamine formaldehyde condensate (15 percent on total solids). After partially stripping the isopropanol as in Example 11, 17.5 parts of 33.4 percent formaldehyde was added dropwise (60 percent of the amine equivalent) and the rest of the solvent was then stripped off. Films cast from this composition, after stoving for 20 minutes at 180° C., were resistant to water, flexible and moderately hard, although less hard then the films described in Example 11.

By adding the alkyl benzene sulphonic acid catalyst C600 to the composition, in the same proportion and by the same technique as in Example 11, the stoving temperature required to produce water-resistant films was reduced to 150° C. and harder coatings were obtained.

EXAMPLE 13

A feed mix was made consisting of 42 parts of butyl acrylate, 69 parts of butyl methacrylate, 24.8 parts of hydroxyethyl acrylate, 14.2 parts of methacrylic acid, 190 parts of isopropanol, and 4.5 parts of azobisisobutyronitrile. The mixture was stirred under reflux and in a nitrogen atmosphere in a flask jacketed at 85° C. for 3 hours. The solution was then cooled to 50° C., and a solution of 10.25 parts of tris(hydroxymethyl)methylamine and 60 parts of water was added dropwise, followed by 28.8 parts of "Cymel 301" methylated melamine formaldehyde resin and then 150 parts of distilled water. The mix was partially stripped of isopropanol in vacuo as described in Example 11 and 5.60 parts of 36.4 percent aqueous formaldehyde, mixed with 20 parts of water, were then added. The remaining isopropanol was then removed in vacuo; a further 30 parts of water were added during this stage to prevent excessive viscosity rise. The product was cooled, and 4.06 parts of the alkyl benzene sulphonic acid catalyst C600, neutralised with a solution of 1.5 parts of tris(hydroxymethyl)methylamine in 15 parts of water, were then added dropwise with stirring.

The product was a fairly viscous, opalescent liquid containing polymer in both disperse and solution phases. Clear, glossy films were obtained by spreading on glass, tinplate, or steel substrates and stoving at 150° C. for 30 minutes. They were hard and flexible, and showed excellent resistance to water and organic solvents such as 2-butoxyethanol.

EXAMPLE 14

A coating composition was made according to the general procedure of Example 13. A feed mix containing 24 parts of butyl acrylate, 16.5 parts of hydroxyethyl acrylate, 9.46 parts of methacrylic acid, 50 parts of butyl methacrylate, 125 parts of isopropanol, and 3 parts of azobisisobutyronitrile was polymerised for 3 hours at 85° C. Tris(hydroxymethyl)methylamine was added at 60 percent of the carboxylic acid equivalent, the formaldehyde was added at 40 percent of the amine equivalent (i.e. 0.8 moles:1), and "Cymel 301" was added at 25 percent on the total solids. The compositions gave good glossy films when coated on steel and tinplate substrates and cured for 20 minutes at 150° C. or 180° C. Films cured at 150° C., however, showed some absorption of moisture whilst films cured at 180° C. had good water-resistance.

In further experiments with this composition, the alkyl benzene sulphonic acid catalyst C600 was added to the coating composition at 0.5 and 1 percent based on the final solution. When the coatings were cured at 150° C., the presence of catalyst caused a considerable increase in hardness and reduction in moisture absorption by the film, with the higher catalyst proportion producing a slightly greater effect.

EXAMPLE 15

Example 14 was repeated using 50 parts of methyl methacrylate in place of the butyl methacrylate. When the composition was applied as a coating and cured, glossy films were obtained having a similar water-resistance to the products of Example 14 when cured under the same conditions. The films were, however, harder and less flexible than the products of Example 14.

EXAMPLE 16

Example 14 was repeated using 50 parts of 2-ethylhexyl methacrylate in place of the butyl methacrylate. When the composition was applied as a coating and cured, glossy films were obtained having a similar water-resistance to the products of Example 14 when cured under the same conditions. The films were, however, softer and more flexible then the products of Example 14.

EXAMPLE 17

An acrylic polymer was prepared as described in Example 14. Tris(hydroxymethyl)methylamine in aqueous solution was then added at 100 percent of the carboxylic acid equivalent of the polymer. A formaldehyde quantity of 65 percent of theory based on amine, i.e. 1.3 moles formaldehyde per mole of amine, was required to give products of similar viscosity and emulsion quality to those obtained from 60 percent tris(hydroxymethyl) methylamine and 40 percent formaldehyde in Example 14. If only 40 percent formaldehyde was used in conjunction with 100 percent tris(hydroxymethyl)methylamine, the solution remained clear and the viscosity was considerably higher. This composition was more difficult to apply as a coating, although the final cured film properties were similar in all cases.

EXAMPLE 18

An acrylic polymer was prepared having the same composition and by the same procedure as Example 12. 100 percent of the theoretical tris(hydroxymethyl)methylamine based on the carboxyl equivalent was added, and the isopropanol stripped off as in Example 12. Portions of the solution were taken, and treated with formaldehyde solution and/or "Cymel 301" methylated melamine formaldehyde crosslinking agent. The samples thus obtained were either diluted with water, or concentrated in vacuo, in order to produce a viscosity figure in a measurable range. The results are tabulated below. The viscosity figures were measured on a Ferranti-Shirley viscometer at a shear rate of 900 sec$^{-1}$ at a temperature of 25° C.

| Ref: | % Formaldehyde (on amine equivalent) | % Cymel 301 (on total solids) | Solids centent (% w/w) | Viscosity (Pa.s. at 900 sec$^{-1}$) |
|---|---|---|---|---|
| A | nil | nil | 29.5 | 3.6 |
| B | 60 | nil | 41.8 | 0.82 |
| C | 90 | nil | 40.9 | 0.102 |
| D | nil | 20 | 34.9 | 6.3 |
| E | 60 | 20 | 45.3 | 0.20 |
| F | 90 | 20 | 45.8 | 0.087 |

When no formaldehyde was used, the coating compositions were viscous solutions at concentrations of about 30 percent of carboxyl-containing polymer in water. When 90 percent formaldehyde was used (i.e. 1.8 moles per mole of amine), the coating compositions were mobile fluid emulsions at about 40 percent carboxyl-containing polymer in water whether or not the amino-formaldehyde cross-linking was used. When 60 percent formaldehyde was used (1.2 moles per mole of amine) the coating composition, in the absence of cross-linking agent, was of medium viscosity at 41.8 percent solids and had the appearance of an opalescent colloidal dispersion. When 20 percent of the amino formaldehyde cross-linking agent was included at this level of formaldehyde, the coating composition was a milky emulsion of considerably lower viscosity.

EXAMPLE 19

An acrylic copolymer was made by the procedure in Example 13 from 28 parts of butyl acrylate, 46 parts of 2-ethylhexyl methacrylate, 16.5 parts of hydroxyethyl acrylate, and 9.46 parts of methacrylic acid. The solution was partially stripped of isopropanol in vacuo, and 30 percent of the theoretical amount of tris(hydroxymethyl)methylamine (TMMA) based on the carboxyl equivalent was added in aqueous solution. A sample of the product, on addition of water, tolerated substantial dilution but could not be diluted with a larges excess of water without some precipitation. When the quantity of TMMA was increased to 35 percent of theoretical, a sample could be diluted with a large excess of water to give an almost clear solution, but showing a slight haze and possibly containing colloidal material. A further increase to 40 percent tris(hydroxymethyl)methylamine improved the clarity of the diluted solution.

The solution containing 40 percent of the theoretical TMMA was stripped of isopropanol in vacuo. From the product, three samples were prepared containing 40 percent, 60 percent and 100 percent TMMA respectively, based on the carboxylic acid equivalent of the resin, all adjusted to a solids content of 27.3 percent. The viscosities were: at 40 percent TMMA—0.115 Pa.s. at 900 sec$^{-1}$ shear rate; at 60 percent TMMA—0.616 Pa.s.; and at 100 percent TMMA—the solution was too viscous to measure.

EXAMPLE 20

56.6 parts of benzoic acid, 122.1 parts of trimethylolpropane, 109 parts of isophthalic acid, and 26 parts of xylene were heated with stirring in an atmosphere of nitrogen under a reflux condenser with separating head (Dean & Stark). The temperature was allowed to rise from 188° C. initially to 253° C. after 2 hours, by distilling off part of the xylene; at this stage the theoretical quantity of water (32 parts) had been removed. The mix was then cooled to 170° C., and 41 parts of trimellitic anhydride were added. After the trimellitic anhydride had dissolved, the mix was held for 15 minutes at 170° C., removed from the vessel, and allowed to solidify on metal trays as a pale, brittle resin. Potentiometric titration showed a carboxylic acid content of 1.15 meq/g of resin, i.e. an acid value of 65.

47.7 parts of powdered resin were stirred with 7.0 parts of tris(hydroxymethyl)methylamine dissolved in 67 parts of water until dissolved. Films were cast from this solution as made, and also after adding Cymel 301 methylated melamine formaldehyde cross-linking agent at 30 percent on the weight of solids. The films were cured by heating to 180° C. for 20 minutes. In the absence of cross-linking agent films had a fairly good resistance to water, and in the presence of Cymel 301 extremely good resistance.

EXAMPLE 21

Two monomer feed mixes were made up having the following compositions in parts:

|                      | Feed 1 | Feed 2 |
|----------------------|--------|--------|
| Butyl acrylate       | 17.5   | 28.0   |
| Butyl methacrylate   | 28.75  | 48.1   |
| Methacrylic acid     | 5.91   | 1.74   |
| Hydroxyethyl acrylate| 10.34  | 9.62   |
| Azobisisobutyronitrile| 1.88  | 2.63   |
| Isopropanol          | 80     | 110    |

Feed 1 was polymerised for 1.5 hours at 85° C. under nitrogen. Feed 2 was then added gradually over a period of 1 hour at 85° C., the reaction mixture then being heated for a further 2 hours at 85° C. The contents of the flask were cooled to 60° C., and 5.37 parts of tris(hydroxymethyl)methylamine in 30 parts of water added, followed by 3.42 parts of the alkyl benzene sulphonic acid catalyst C600 which had been first neutralised with 1.1 parts of tris(hydroxymethyl)methylamine in 12 parts of water. 31.2 parts of Cymel 301 methylated melamine formaldehyde cross-linking agent were then added, followed by the dropwise addition, with stirring, of 200 parts of water. The white opaque dispersion thus obtained was substantially stripped of isopropanol by vacuum distillation, water being added as required to maintain the viscosity. The product was an emulsion containing polymer in both disperse and solution phases. Films cast on glass, tinplate, or steel substrates and stoved for 30 minutes at 150° C. showed good resistance to water and organic solvents such as 2-butoxyethanol.

EXAMPLE 22

Two monomer feed mixes were prepared having the following compositions in parts:

|                               | Feed 1 | Feed 2 |
|-------------------------------|--------|--------|
| Organics:                     |        |        |
| Stearyl methacrylate          | 32.2   | nil    |
| Butyl methacrylate            | nil    | 43.6   |
| Methyl methacrylate           | nil    | 18.1   |
| Butyl acrylate                | 29.6   | 25.7   |
| Hydroxymethyl acrylate        | 13.9   | 11.1   |
| Methacrylic acid              | 7.2    | 1.6    |
| Acrylic acid                  | 1.2    | nil    |
| Dodecyl mercaptan             | 0.29   | 0.34   |
| Aqueous phase:                |        |        |
| Azocyanovaleric acid          | 1.7    | 2.0    |
| Tris(hydroxymethyl)methylamine| 12.1   | nil    |
| Water                         | 135    | nil    |

The azocyanovaleric acid initiator was dissolved in the aqueous phase in Feed 1 and slurried in the monomers in Feed 2.

0.5 parts of a non-ionic dispersing agent (a blend of sorbitan oleate and its ethoxylated derivative sold under the trade marks Span 80 and Tween 80, and having a hydrophile/lipophile balance of 12) were dissolved in 20 percent of the organic part of Feed 1. This was then mixed with 20 percent of the aqueous portion and emulsified by stirring; the emulsion was transferred to a stirred reactor and polymerised at 80° C. under an atmosphere of nitrogen for 30 minutes. The remainder of Feed 1, organic and aqueous, was then emulsified using the above polymer solution, and polymerised for 1 hour at 80° C. 7.9 parts of 36.4 percent aqueous formaldehyde mixed with 42 parts of water were then pumped in and allowed to react for 5 minutes. Feed 2 was then pumped in over 25 minutes, and polymerisation continued for a further 2 hours. The product was a creamy emulsion, which was readily filtered through sand and was completely dilutable with water. The total solids content was 50.5 percent. The emulsion contained only 0.25 percent of the non-ionic dispersing agent based on resin solids.

Films cast from the emulsion on glass, tinplate, or steel substrates and stoved for 20 minutes at 180° C. showed moderately good resistance to water and 2-butoxyethanol. Improved results were obtained by adding Cymel 301 methylated melamine formaldehyde cross-linking agent at 20 percent based on total solids and the alkyl benzene sulphonic acid catalyst C600 (pre-neutralised with tris(hydroxymethyl)methylamine as described in Example 21) at 1.7 percent based on total solids to the emulsion before casting the films. Curing was then satisfactory at 150° C. and resistance to water and organic solvents such as 2-butoxyethanol was improved.

EXAMPLE 23

Two monomer feed mixes were prepared having the following compositions in parts:

|                      | Feed 1 | Feed 2 |
|----------------------|--------|--------|
| Stearyl methacrylate | 23.0   | nil    |
| Butyl methacrylate   | nil    | 49.0   |
| Butyl acrylate       | 21.1   | 43.2   |
| Hydroxyethyl acrylate| 9.9    | 19.8   |
| Methacrylic acid     | 5.16   | 6.88   |

|  | Feed 1 | Feed 2 |
| --- | --- | --- |
| Acrylic acid | 0.85 | 1.14 |
| Azobisisobutyronitrile | 1.50 | 3.00 |
| Isopropanol | 70 | 140 |

Feed 1 was pumped into a reactor jacketed at 85° C. over a period of 20 minutes, and allowed to react for a further 10 minutes under an atmosphere of nitrogen. Feed 2 was then pumped in over a period of 40 minutes, and polymerisation was continued for a further 2 hours. The mix was cooled to 70° C., and 12.2 parts of tris(hydroxymethyl)methylamine in 50 parts of water were added, followed by 34.6 parts of "Cymel 301" methylated melamine formaldehyde cross-linking agent and 210 parts of water. The isopropanol was stripped off in vacuo, water being added as required to avoid an excessive rise in viscosity. After half of the isopropanol had been removed, 6.7 parts of 36.4 percent aqueous formaldehyde plus 6.7 parts of water were added, and distillation of the isopropanol continued. The final product was an aqueous emulsion containing polymer in both continuous and disperse phases. The total solids content was 50.6 percent. Films were cast from the product on various substrates. After stoving at 150° C. for 30 minutes, the films were clear and glossy and showed excellent resistance to water and organic solvents, such as 2-butoxy-ethanol.

EXAMPLE 24

N,N-bis(2-hydroxyethyl)methacrylamide was prepared by the alcoholysis of methylmethacrylate with diethanolamine in the presence of sodium methoxide catalyst, following the general procedure of Gast, Schneider and Cowen (J. Am. Oil Chem. Soc. 43 418 (1966)). The crude product was stripped of volatile materials in vacuo, and then dissolved in water and treated with a strong acid ion-exchange resin, sold under the trade mark Dowex X 50, to remove unchanged diethanolamine and any basic by-products. After removing the water in a rotary vacuum evaporator, a colourless oil was obtained which was shown by NMR analysis to be the desired compound in a satisfactory state of purity.

A copolymer was made from 5.60 parts of butyl acrylate, 9.21 parts of 2-ethylhexyl methacrylate, 2.06 parts of methacrylic acid, and 3.13 parts of N,N-bis(2-hydroxyethyl)methacrylamide polymerised in 25 parts of isopropanol with 0.6 parts of azobis-isobutyronitrile at 80° C. under nitrogen for 3 hours. To the solution was added 2.03 parts of tris(hydroxymethyl)methylamine in 30 parts of water, and the isopropanol was then partially removed by vacuum stripping. Films were cast on glass plates, dried, and stoved for 20 minutes at 180° C. The coatings were clear, glossy, hard, and had excellent resistance to water.

EXAMPLE 25

N-(1,1-dimethyl-2-hydroxyethyl)methacrylamide was made by the method of de Benneville, Luskin and Simms, J. Org. Chem. 23 1355 (1958). A feedmix was prepared containing 1.98 parts of N-(1,1-dimethyl-2-hydroxyethyl)methacrylamide, 1.09 parts of methacrylic acid, 4.82 parts of butylmethacrylate, 0.32 parts of azobis-isobutyronitrile and 12 parts of isopropanol. This was polymerised by heating to 80° C. for 3½ hours under an atmosphere of nitrogen.

To the polymer solution was added 1.08 parts of tris(hydroxymethyl)methylamine in 27 parts of water, and the isopropanol distilled off in vacuo. The alkyl benzene sulphonic acid catalyst C600 (pre-neutralised with tris(hydroxymethyl)methylamine as described in Example 21), was then added at 3 percent on toal solids followed by 1.13 parts of 36.4 percent aqueous formaldehyde diluted with 5 parts of water. The addition of the formaldehyde converted the clear, aqueous solution to an emulsion. Films cast from this emulsion were clear and glossy, and could be cured by heating to 180° C. for 20 minutes.

EXAMPLE 26

A feedmix was prepared consisting of 5.45 parts of N(1,1-dimethyl-2-hydroxyethyl)methacrylamide, 5.18 parts of butyl acrylate, 9.66 parts of butyl methacrylate, 4.48 parts of methacrylic acid, 1.0 parts of azobis-isobutyronitrile and 35 parts of isopropanol. This was polymerised by heating to 80° C. under nitrogen for 3 hours. A solution of 2.10 parts of tris(hydroxymethyl)methylamine in 5 parts of water was then added, followed by 30 parts of water, and the bulk of the isopropanol was removed by vacuum distillation. Films cast from this solution were stoved at 150° C., and also at 180° C., for 30 minutes; all films were hard, glossy and had good resistance to water, with those baked at 180° C. having slightly the better properties.

EXAMPLE 27

A feedmix was made up consisting of 28 parts of butyl acrylate, 40 parts of butyl methacrylate, 15.5 parts of methacrylic acid, 16.5 parts of N,N-bis-(2-hydroxyethyl)methacrylamide, 3 parts of azobis-isobutyronitrile, and 120 parts of isopropanol. The mixture was stirred under reflux in an atmosphere of nitrogen for 3 hours at 80° C. The resulting polymer solution was cooled, and 7.15 parts of 2-amino-2-ethylpropane-1,3-diol in 20 parts of water were added, followed by 140 parts of water. The bulk of the isopropanol was then removed by vacuum distillation, water being added as required to control the viscosity. Films were cast from the resulting composition on glass and metal substrates, and cured at 150° C. for 30 minutes. The cured films were hard and glossy, had good mechanical properties, and were resistant to water and organic solvents such as 2-butoxyethanol.

EXAMPLE 28

A polymer solution was prepared as described in Example 27 and 8.48 parts of tris(hydroxymethyl)methylamine in 20 parts of water were added, followed by 140 parts of water. The isopropanol was substantially all removed to leave a clear aqueous solution. Films cast from this solution and cured at 180° C. for 20 minutes were hard, glossy and resistant to water.

EXAMPLE 29

A copolymer solution was prepared by reacting the following composition for 3 hours at 80° C.:

|  | Parts |
| --- | --- |
| Butyl methacrylate | 42 |
| Butyl acrylate | 28 |
| Methacrylic acid | 12 |
| N,N-bis(2-hydroxyethyl)methacrylamide | 18 |
| Azobis-isobutyronitrile | 3 |

| | Parts |
|---|---|
| Isopropanol | 150 |

15.2 parts tris(hydroxymethyl)methylamine in 35 parts of water were added, followed by 250 parts of water. The isopropanol was stripped off and the resulting clear solution when coated on glass and metal substrates and cured at 150° C. for 30 minutes or at 180° C. for 20 minutes gave clear, glossy water-resistant films.

What is claimed is:

1. A coating composition in the form of a stable aqueous dispersion comprising an aqueous solution of synthetic resin containing free carboxyl groups held in solution in water by an amine and a synthetic resin containing free carboxyl groups dispersed in the same synthetic resin solution characterized in that the amine is a tertiary carbinamine having at least two hydroxy methyl groups bonded to the carbon atom carrying the amine group and is present at 0.3 to 1.1 moles per gram equivalent of total free carboxyl groups in the dissolved and dispersed resin.

2. A coating composition according to claim 1 wherein the carbinamine has the formula

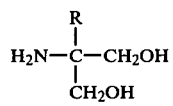

where R is selected from the group consisting of alkyl, haloalkyl, hydroxyalkyl, cycloalkyl, halocycloalkyl, hydroxycycloalkyl, aryl, haloaryl, hydroxyaryl, aralkyl, haloaralkyl, and hydroxyaralkyl.

3. A coating composition according to claim 1 characterized in that the stable aqueous dispersion is formed from a solution of the said synthetic resins and the said amine in a mixture of water and a water miscible organic solvent by removal of the organic solvent.

4. A coating composition according to claim 1 characterized in that the dissolved and dispersed synthetic resins contain in total 0.7 to 2.0 milliequivalents of free carboxyl groups per gram.

5. A coating composition according to claim 1 characterized in that the dissolved and dispersed synthetic resins are each a copolymer of acrylic or methacrylic acid with one or more ethylenically unsaturated comonomers, at least one of which contains an amide group or a hydroxy group.

6. A coating composition comprising a stable aqueous colloidal dispersion of an emulsion of a synthetic resin containing free carboxyl groups and containing a synthetic resin in both the aqueous phase and the dispersed phase characterized in that the colloidal dispersion or emulsion is formed by the reaction of formaldehyde with a composition containing said synthetic resin held in solution in water by a tertiary carbinamine having at least two hydroxymethyl groups bonded to the carbon atom carrying the amine group and present at 1.1 moles per gram equivalent of total free carboxyl groups in the resin.

7. A coating composition according to claim 5, characterised in that the copolymer contains polymerised units of an N-β-hydroxyalkyl or N,N-bis(β-hydroxyalkyl) derivative of acrylamide or methacrylamide.

8. A coating composition according to claim 1, characterised in that the tertiary carbinamine is tris(hydroxymethyl)methylamine, 2-amino-2-methyl-propane-1,3-diol or 2-amino-2-hydroxymethyl-butan-1-ol.

9. A coating composition according to claim 6, characterised in that the amount of formaldehyde used is 0.5–1.7 moles formaldehyde per mole of tertiary carbinamine used.

10. A coating composition according to claim 1, characterised in that it contains an amino-formaldehyde condensate as cross-linking agent.

11. A coating process in which a substrate is coated with a coating composition and cured by heating, characterised in that a coating composition according to claim 1 is used.

12. A coating composition according to claim 6 wherein the carbinamine has the formula

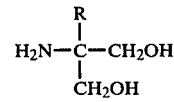

where R is selected from the group consisting of alkyl, haloalkyl, hydroxyalkyl, cycloalkyl, halocycloalkyl, hydroxycycloalkyl, aryl, haloaryl, hydroxyaryl, aralkyl, haloaralkyl, and hydroxyaralkyl.

* * * * *